United States Patent
Walter et al.

(10) Patent No.: US 12,111,658 B2
(45) Date of Patent: Oct. 8, 2024

(54) ALTERNATIVE PILOTING SYSTEM FOR INTEGRATING IN A PRE-EXISTING AIRCRAFT

(71) Applicant: SAFRAN ELECTRONICS & DEFENSE, Paris (FR)

(72) Inventors: Eric Walter, Paris (FR); Hoon Ta Huang Jackson, Paya Lebar (SG); Julien Farjon, Paris (FR); Loïc Fougeres, Paris (FR); Mikaël Diaz, Paris (FR); Ng Kwee Chye, Paya Lebar (SG); Nicolas Cadalen, Paris (FR); Philippe Tranie, Paris (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 517 days.

(21) Appl. No.: 17/416,179

(22) PCT Filed: Dec. 19, 2019

(86) PCT No.: PCT/EP2019/086271
§ 371 (c)(1),
(2) Date: Jun. 18, 2021

(87) PCT Pub. No.: WO2020/127704
PCT Pub. Date: Jun. 25, 2020

(65) Prior Publication Data
US 2022/0075372 A1 Mar. 10, 2022

(30) Foreign Application Priority Data
Dec. 19, 2018 (FR) ...................................... 18 73405

(51) Int. Cl.
*G05D 1/00* (2024.01)
*B64C 13/18* (2006.01)

(52) U.S. Cl.
CPC ......... *G05D 1/0061* (2013.01); *G05D 1/0011* (2013.01); *B64C 13/18* (2013.01)

(58) Field of Classification Search
CPC .................. B64D 45/0031; B64D 45/0034; B64C 13/18; G05D 1/0011; G05D 1/0061;
(Continued)

(56) References Cited

U.S. PATENT DOCUMENTS

| | | | | |
|---|---|---|---|---|
| 5,039,037 A * | 8/1991 | DeLuca | ............... | G05D 1/0638 244/175 |
| 8,145,365 B2 * | 3/2012 | Flotte | ................... | G05D 1/0646 701/16 |

(Continued)

FOREIGN PATENT DOCUMENTS

| | | | | |
|---|---|---|---|---|
| CA | 2995699 A1 * | 9/2018 | ............. | B64C 13/18 |
| EP | 2050671 A1 * | 4/2009 | ............. | B64C 13/18 |

(Continued)

OTHER PUBLICATIONS

Translated version of EP-3361344-B1 by Vieux T (year: 2020).*
(Continued)

*Primary Examiner* — Cuong H Nguyen
(74) *Attorney, Agent, or Firm* — MUNCY, GEISSLER, OLDS & LOWE, P.C.

(57) ABSTRACT

An alternative piloting system arranged to be integrated in a pre-existing aircraft that includes original systems having flight control and autopilot systems. The autopilot system includes a piloting device independent of the original systems, having a positioning unit arranged to produce positioning data relating to the aircraft, and a control unit arranged to produce an alternative piloting setpoint for the aircraft; an acquisition and analysis device, including acquisition device arranged to acquire data produced by the original systems, positioning data and alternative piloting (Continued)

setpoint as produced by the piloting device, and decision device arranged to decide whether the alternative piloting setpoint should or should not be used for piloting the aircraft; and an interface device arranged to control the flight control system on the basis of the alternative piloting setpoint when the decision device of the acquisition and analysis device decide that said alternative piloting setpoint should be used for piloting the aircraft.

14 Claims, 1 Drawing Sheet

(58) Field of Classification Search
CPC .. G05D 1/0022; G05D 1/0055; G05D 1/0808; G09B 9/50; B60W 60/0051; B60W 60/0053; B60W 60/007
USPC .................................................. 701/11, 14
See application file for complete search history.

(56) References Cited

U.S. PATENT DOCUMENTS

| | | | | |
|---|---|---|---|---|
| 8,255,098 B2 * | 8/2012 | Jones | ............... | B64D 45/0031 |
| | | | | 244/76 R |
| 8,527,118 B2 * | 9/2013 | Jones | ................... | G01C 23/00 |
| | | | | 244/76 R |
| 10,589,845 B2 * | 3/2020 | Sheffer | ................ | B64C 13/22 |
| 11,230,366 B2 * | 1/2022 | Shavit | ................... | B64C 13/20 |
| 11,535,373 B2 * | 12/2022 | Johnson | .............. | G08G 5/0013 |
| 11,584,542 B1 * | 2/2023 | Moy | ................... | G08G 5/0021 |
| 11,586,196 B2 * | 2/2023 | Venkataramana | .... | G06F 3/0482 |
| 2006/0025900 A1 * | 2/2006 | Arnouse | ........... | B64D 45/0034 |
| | | | | 701/3 |
| 2009/0105890 A1 * | 4/2009 | Jones | ................... | G01C 23/00 |
| | | | | 701/1 |
| 2009/0105891 A1 * | 4/2009 | Jones | ............... | B64D 45/0031 |
| | | | | 701/2 |
| 2018/0016027 A1 * | 1/2018 | Cheatham, III | ....... | B64U 10/25 |
| 2018/0290729 A1 | 10/2018 | Shavit | | |

FOREIGN PATENT DOCUMENTS

| | | | | |
|---|---|---|---|---|
| EP | 3121121 A1 | 1/2017 | | |
| EP | 3361344 B1 * | 11/2020 | ........... | B64C 39/024 |
| GB | 2 381 879 A | 5/2003 | | |
| GB | 2453854 A * | 4/2009 | ............. | G01C 21/00 |

OTHER PUBLICATIONS

Villarroel, Jesus. An abstract of "An optimal control framework for flight management systems". Diss. Concordia University, 2015.*
Van Dam, Stijn BJ. An abstract of "Ecological Approach to Pilot Traffic Awareness." Delft University of Technology (2014).*
Sanchez-Lopez, Jose Luis, et al. "Aerostack: An architecture and open-source software framework for aerial robotics." 2016 International Conference on Unmanned Aircraft Systems (ICUAS). IEEE, 2016.*
Kim, Joshua P. "Evaluation of unmanned aircraft flying qualities using JSBSim." (2016).*
An abstract.*
Barbara Peterson, "Two People in a Cockpit Isn't Enough: What We Need to Prevent Future Air Disasters", Apr. 1, 2015 (Apr. 1, 2015), XP055640744, Retrieved from the Internet: URL:https://www.popularmechanics.com/flight/a14871/germanwings-flight-9525-cockpit-s afety-rules/ [retrieved on Nov. 8, 2019] p. 2-p. 3.

* cited by examiner

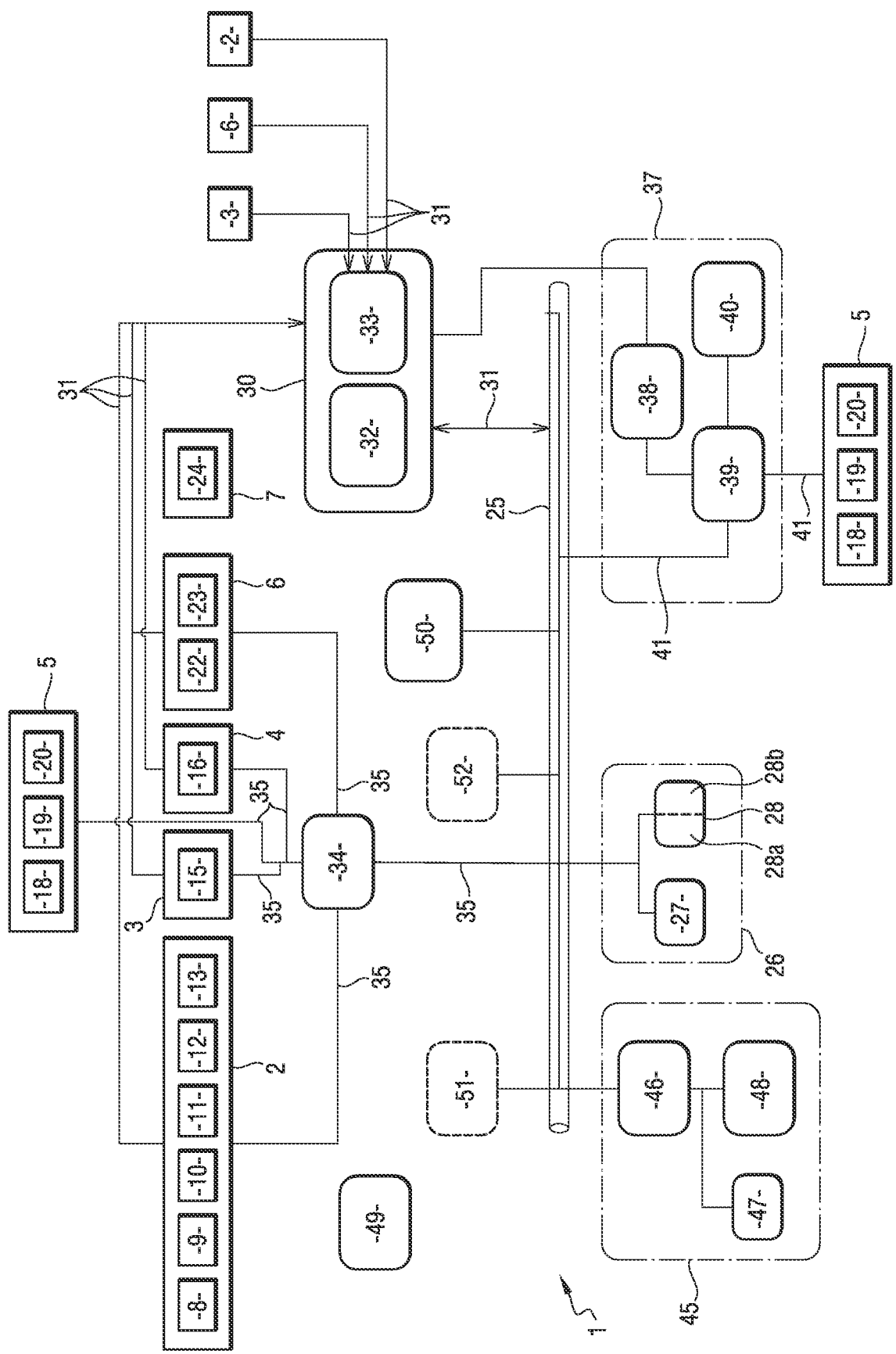

ALTERNATIVE PILOTING SYSTEM FOR INTEGRATING IN A PRE-EXISTING AIRCRAFT

The invention relates to the field of alternative piloting systems for integrating in pre-existing aircraft.

BACKGROUND OF THE INVENTION

Modern airliners are generally piloted by a crew of at least two pilots comprising a captain and a co-pilot.

Plans are being made to fly certain such airliners with only one pilot for very specific applications, and in particular for transporting cargo. Plans are thus being made to convert an Airbus A321 type airliner into a cargo plane suitable for being piloted by a single pilot.

Reconfiguring an airliner in this way presents numerous advantages.

By transforming a pre-existing airliner that has already been flying for several years into a cargo plane, a time-tested and reliable cargo plane is obtained without any need to finance an entire new airplane development program. Furthermore, the financial return on the initial program is improved by means of this new application.

Since, unlike an airliner, a cargo plane does not transport passengers, reducing the number of pilots would appear to be an initial step that is easier for the general public to accept. Naturally, there is no question of accepting any reduction in flight safety, which should not be degraded, but which should rather be improved by this configuration.

By reducing the number of pilots, the overall cost of each flight is naturally also reduced.

Furthermore, various solutions have emerged that serve to assist a pilot in piloting tasks, potentially improving safety by being able to analyze a large quantity of data in real time.

Nevertheless, reconfiguring an airliner in this way also encounters various difficulties.

Reducing the number of pilots makes it necessary to develop various additional safety functions, and to integrate them in the airplane.

These additional safety functions relate in particular to ensuring that the airplane continues to be piloted in complete safety even in the event of a failure of the autopilot system or in the event of the sole pilot being incapable of piloting the airplane manually. The additional safety functions must also serve to prevent, or at least to limit, the consequences of a malicious act undertaken by the pilot, such as for example deliberately crashing of the airplane into infrastructure or populated areas.

Naturally, for the conversion of a pre-existing airliner into a cargo plane to be advantageous from an economic point of view, it must be possible to integrate these additional safety functions in pre-existing airplanes, while requiring only limited additional certification activity.

OBJECT OF THE INVENTION

An object of the invention is to convert a conventional pre-existing airplane in reliable and inexpensive manner into an airplane that can be piloted by a single pilot.

SUMMARY OF THE INVENTION

In order to achieve this object, there is proposed an alternative piloting system arranged to be integrated in a pre-existing aircraft that includes original systems comprising a flight control system and an autopilot system, the alternative piloting system comprising:

a piloting device independent of the original systems, comprising a positioning unit arranged to produce positioning data relating to the aircraft, and a control unit arranged to produce an alternative piloting setpoint for the aircraft;

an acquisition and analysis device, comprising acquisition means arranged to acquire data produced by the original systems and also the positioning data and the alternative piloting setpoint as produced by the piloting device, and decision means arranged to decide whether the alternative piloting setpoint should or should not be used for piloting the aircraft; and an interface device arranged to control the flight control system of the aircraft on the basis of the alternative piloting setpoint when the decision means of the acquisition and analysis device decide that said alternative piloting setpoint should be used for piloting the aircraft.

The alternative piloting system is thus for integrating in a pre-existing aircraft. In the event of the pilot becoming unavailable or of an outage of the autopilot system, the alternative piloting setpoint can be used to pilot the aircraft. It is thus safe for the aircraft to be piloted by a single pilot. Furthermore, since the piloting device is independent of the original systems, and dissimilar from them in terms of the technologies used or in their implementation in the aircraft, the piloting device cannot be impacted by a failure affecting those original systems. This thus ensures, in particular, that the positioning unit can produce positioning data relating to the aircraft even in the event of an outage of the original positioning systems (e.g. the pre-existing inertial units of the aircraft).

The alternative piloting system can be integrated in the pre-existing aircraft without modifying the original systems. There is thus no need for the original systems to be subjected once again to certification activity, thereby reducing the cost of integration. Furthermore, the proposed principle of integration relies on the principle of segregating the new functions via a high-integrity interface device.

There is also proposed an aircraft including an alternative piloting system of the kind described above.

The invention can be better understood in the light of the following description of a particular, nonlimiting embodiment of the invention.

BRIEF DESCRIPTION OF THE DRAWING

[Sole FIGURE] Reference is made to the accompanying drawing comprising a sole FIGURE that shows the alternative piloting system of the invention, together with a plurality of original systems of a pre-existing aircraft.

DETAILED DESCRIPTION OF THE INVENTION

With, reference to the sole FIGURE, the alternative piloting system 1 of the invention is for integrating in a pre-existing aircraft. The term "pre-existing aircraft" it is used to mean that, when the aircraft was designed, no provision was made for it to be fitted with the alternative piloting system 1 of the invention. In other words, at the time it was designed, of the aircraft did not include specific interfaces for integrating the alternative piloting system 1 of the invention.

The aircraft is an airliner that is to be converted into a cargo plane suitable for being piloted by a single pilot. The alternative piloting system 1 is integrated in the airplane so as to enable it to be piloted by that single pilot while still complying with the safety and security requirements that are applicable to a conventional cargo plane piloted by a plurality of pilots.

The airplane includes a certain number of original systems, i.e. systems that were present at the time the airplane was designed.

These original systems include a flight control system 2, a landing gear system 3, a lighting system 4, a communication system 5, an autopilot system 6, and a navigation system 7. The landing gear system 3 includes a system for steering at least one undercarriage of the landing gear system, enabling the airplane to be steered when it moves on the ground, and also a braking system.

The original systems naturally include systems other than those mentioned above.

All of the original systems comprise equipment that is potentially provided with redundancy, and possibly in triplicate.

The flight control system 2 comprises pedals 8, a pitch control wheel 9, an elevator aileron computer (ELAC) system 10, a spoiler elevator computer (SEC) system 11, a forward air controller (FAC) system 12, and a slat flap control computer (SFCC) system 13.

The undercarriage system 3 includes a braking and steering control unit (BSCU) 15.

The lighting system 4 includes landing lights 16 and lighting control means.

The communication system 5 includes communication means 18 in the very high frequency (VHF) band, communication means 19 in the high-frequency (HF) band, and satellite communication (SATCOM) means 20.

The autopilot system 6 includes a flight management guidance computer (FMGC) system 22 and a full authority digital engine control (FADEC) system 23.

The navigation system 7 includes an air data inertial reference system (ADIRS) 24.

The alternative piloting system 1 co-operates with these original systems and with the original avionics, but it is completely separate from those original systems and from the original avionics. The separation is mechanical separation, software separation, and hardware separation. Thus, a failure or an outage of the alternative piloting system 1 (e.g. caused by hacking) has no significant impact on the original systems or on the original avionics.

The alternative piloting system 1 has a plurality of devices and a main bus 25, which in this example is an ARINC 664 data bus, suitable for conveying commands and data.

The various devices of the alternative piloting system 1 communicate with one another via the main bus 25. All of the devices of the alternative piloting system 1 are provided with appropriate protection means (firewall, antivirus, etc.) serving to make such communication secure.

The devices of the alternative piloting system 1 comprise firstly a piloting device 26. The piloting device 26 is connected solely to the main bus 25. The piloting device 26 is thus totally independent of the original systems of the airplane. The piloting device 26 is connected solely to an interface device 34 that is described below, and it is thus almost completely self-contained.

The piloting device 26 comprises a positioning unit 27 and a control unit 28.

The positioning unit 27 comprises an inertial measurement unit, a satellite positioning device having one or more antennas, and an air data computer.

The positioning unit 27 produces positioning data relating to the airplane. The positioning data comprises both location data and orientation data for the airplane.

The positioning unit 27 is independent and self-contained relative to the original positioning equipment of the airplane, and is different in design. This imparts dissimilarity between the positioning unit 27 and the original positioning equipment of the airplane, thus serving in particular to ensure that a common mode failure does not lead to simultaneous outages both of the original positioning equipment of the airplane and of the positioning unit 27.

The control unit 28 has two dissimilar calculation channels 28a and 28b. This serves to avoid a common mode failure leading to simultaneous outages of both calculation channels 28a and 28b.

The control unit 28 is arranged to produce an alternative, piloting setpoint for the airplane.

This alternative piloting setpoint is used to pilot the airplane when the airplane is in an emergency situation forming part of a predefined list of emergency situations. The predefined list of emergency situations comprises any failure occurring on the airplane, a failure of the autopilot system 6 of the airplane, unavailability of the pilot of the airplane, and a situation in which the airplane is going towards a prohibited area.

In particular, the control unit 28 hosts emergency piloting relationships that are used in the event of the autopilot system of the airplane failing. The emergency piloting relationships serve to stabilize the airplane and to maintain its speed.

The control unit 28 also hosts fail soft piloting relationships.

The fail soft piloting relationships include a relationship for mitigating the pilot becoming unavailable while the airplane is taking off. By way of example, the pilot becoming unavailable may be the result of the pilot dying suddenly or else becoming physically or psychologically incapacitated for any reason whatsoever during a flight.

While the airplane is taking off, if the pilot becomes unavailable, it is still possible to interrupt takeoff so long as the speed of the airplane is below a determined speed V1. Once the speed of the airplane exceeds the determined speed V1, takeoff can no longer be interrupted since it is too risky to use ground breaking of the airplane at high speed, and it is then imperative to make the airplane takeoff.

Between the moment when the airplane exceeds the determined speed V1 and the moment when the aircraft exceeds a determined altitude, e.g. equal to 200 feet, it is normally the pilot who pilots the airplane in manual mode.

Thus, when it is detected that the pilot is unavailable during this period, which lasts for several seconds, typically six seconds, it is the alternative piloting system 1 that takes over from the pilot and that manages takeoff. Thereafter, the autopilot system 6 takes over from the alternative piloting system 1.

In the event of the pilot being unavailable, the control unit 28 also hosts emergency flight plans. Thus, if the pilot is unavailable, the alternative piloting system 1 causes the airplane to go to an airport where it can land.

The control unit 28 may also produce the alternative piloting setpoint so as to avoid the airplane penetrating into predefined prohibited areas. The alternative piloting setpoint serves to give the airplane a path that no longer leads to the airplane penetrating into Predefined prohibited areas. By way of example, a predefined prohibited area is an area containing particular infrastructure (e.g. a nuclear power station), an area of high population density, etc.

The control unit 28 continuously calculates the future path of the airplane while making use of the positioning data produced by the positioning unit 27, and it estimates whether the future path interferes with a prohibited area. In the event of the pilot going towards a prohibited area, whether because the pilot is unavailable, or because the pilot seeks to crash the airplane deliberately, the alternative piloting setpoint produced by the alternative piloting system 1 is used to pilot the airplane and to prevent it from penetrating into the prohibited area. If necessary, the alternative piloting setpoint causes the airplane to crash in an unpopulated area. This performs a "geofencing" function: The position of the airplane is monitored in real time, and if the airplane is going towards a prohibited area, action is taken on its flightpath to prevent the airplane from penetrating into the prohibited area.

The control unit 21 thus makes use of relationships for guiding a controlled crash and also of an algorithm for detecting the loss of the geofencing function.

The control unit 28 hosts the geographical coordinates of prohibited areas.

The alternative piloting system 1 also includes an acquisition and analysis device 30. The acquisition and analysis device 30 is connected to the main bus 25, and also to the flight control system 2, to the landing gear system 3, to the lighting system 4, to the communication system 5, and to the autopilot system 6, via secondary buses 31, which in this example are A429 buses.

The acquisition and analysis device 30 comprises acquisition means 32 and analysis means 33.

The acquisition means 32 include a plurality of interfaces with the original systems and a plurality of interfaces with the main bus 25.

The acquisition means 32 acquire data produced by the original systems of the airplane together with the positioning data and the alternative piloting setpoint produced by the piloting device 26.

The data produced by the original systems of the airplane and acquired by the acquisition and analysis device 30 comprises airplane position data, attitude data, parameters produced by the autopilot system 6, parameters produced by the flight control system 2, engine parameters, navigation data, failure data, etc.

The analysis means 33 of the acquisition and analysis device 30 process and analyze all of this data. The analysis means 33 detect inconsistencies, if any, in this data.

The analysis means 33 prepare the data for transmitting it to the ground (sorting, formatting, etc.). The analysis means 33 also host a state machine that serves to support the pilot (cross checks, additional pilot actions), and also to trigger emergency procedures or to allow commands issued by the piloting device 26 to be taken into account.

On the basis of all this data, on the basis of the alternative piloting setpoint, and on the basis of the results of its own processing and analyses, the acquisition and analysis device 30 decides whether or not the alternative piloting setpoint should be used for piloting the airplane. The acquisition means 32 of the acquisition and analysis device 30 acquire the alternative piloting setpoint, a manual piloting setpoint produced by the pilot of the airplane, and an automatic piloting setpoint produced by the autopilot system 6. The analysis means 33 analyze these piloting setpoints in order to decide, on the basis of this analysis, whether the alternative piloting setpoint should or should not be used for piloting the aircraft.

A first example of analysis is mentioned above in this description. While the airplane is taking off, there is a short period during which the airplane is normally piloted manually by the pilot. If it is detected that the pilot is unavailable, the analysis means 33 of the acquisition and analysis device 30 decide that the alternative piloting setpoint produced by the alternative piloting system 1 should be used for piloting the aircraft. Thereafter, following this short period, the analysis means 33 of the acquisition and analysis device 30 decide that the alternative piloting setpoint should no longer be used for piloting the airplane. The autopilot system 6 thus takes over from the alternative piloting system 1 in order to land the airplane safely.

A second example of selecting of the priority setpoint is as follows.

If a manual piloting setpoint as produced by the pilot is tending to make the aircraft go towards a predefined prohibited area, the analysis means of the acquisition and analysis device 30 decide that the alternative piloting setpoint produced by the alternative piloting system 1 should be used to pilot the airplane. The airplane and then performs a maneuver enabling it to avoid penetrating into the prohibited area.

Thereafter, following this maneuver, the analysis means 33 decide that the alternative piloting setpoint should no longer be used for piloting the airplane: the acquisition and analysis device 30 returns control to the autopilot system 6 after the alternative piloting system 1 has performed the maneuver.

A third example of selecting of the priority setpoint is as follows.

By analyzing airplane parameters (for example analyzing engine setpoints and setpoints for the flight control surfaces), the acquisition and analysis device 30 is also capable of detecting a failure situation having an impact on the airplane. If the airplane is being piloted by the autopilot system 6 and if the failure is likely to have an impact on the autopilot system 6, the acquisition and analysis device 30 decides that the alternative piloting setpoint should be used for piloting the airplane and engages an emergency piloting mode.

The alternative piloting system 1 also includes an interface device 34.

The interface device 34 is connected to the main bus 25, and also to the flight control system 2, to the landing gear system 3, to the lighting system 4, to the communication system 5, and to the autopilot system 6, via secondary buses 35, which in this example are A429 buses.

The interface device 34 comprises switch means. The switch means are controlled by the decision means 33 of the acquisition and analysis device 30. When the decision means 30 decide that the alternative piloting setpoint is to be used for piloting the airplane, the decision means control of the switch means to connect an output of the piloting device 26 to the flight control system 2.

The interface device 34 thus applies the alternative piloting setpoint as produced by the piloting device 26 when the acquisition and analysis device 30 decide that that is the setpoint that is to be used.

The interface device 34 provides the physical interface for activating airplane controls: flight controls, landing gear, flaps, breakers, etc. . . . .

The alternative piloting system 1 further includes a communication device 37 that comprises a secure data module (DM) 38, an air data terminal (ADT) module 39, and a C2link module 48.

These modules form interface means with a remote piloting system, communication means with remote control, and data security means serving to ensure the integrity of recorded information. Integrity relies in particular on making secure the recorded data and the commands by using the principles implemented in a safety checker.

The communication device 37 is connected to the main bus 25 via the ADT module 39, and also to the communication system 5 via secondary buses 41, which in this example are A429 buses. The communication device 37 is connected to the acquisition and analysis device 30 by a serial link.

The communication device 37 enables the airplane to be remotely controlled. In particular, the communication device 37 serves to establish communication with the ground, so that the alternative piloting system 1 can be controlled from the ground. Thus, in the event of the pilot being unavailable, for example, radio communication and control of the airplane can be managed from the ground.

The communications performed by the communication device 37 between the airplane and the ground may take place over direct (line of sight) radio links, over satellite links, or indeed using ground radio communication infrastructure (e.g. 4G or 5G type mobile telephone networks).

The alternative piloting system 1 also includes a taxiing control device 45 that comprises a taxi assistance system (TAS) module 46, a guide device 47 capable of using one or more cameras and of performing image processing, and an anti-collision device 48, e.g. making use of radar and potentially also of a camera imaging device (daylight, long wavelength infrared (LWIR)).

The taxiing control device 45 is connected externally to the main bus 25.

The taxiing control device 45 is suitable for producing a piloting setpoint for the airplane on the ground. In the event of the pilot being incapacitated before the airplane reaches the determined speed V1 during takeoff (as explained above in this description), the taxiing control device 45 is suitable for braking the airplane, and it also serves to keep the airplane on the axis of the runway under such conditions. The taxiing control device might also perform taxiing, taking the place of the pilot.

The alternative piloting system 1 also has a power supply device 49 including an uninterruptible power supply. The power supply device 49 is a self-contained and independent device that powers the alternative piloting system 1 even in the event of a failure having an impact on the power generation systems of the airplane. The power supply device 49 is connected to the other devices of the alternative piloting device 1 by independent power buses.

The alternative piloting system 1 also includes a system monitoring device 50 for monitoring the airplane.

The system monitoring device 50 includes a screen located in the cockpit.

The system monitoring device 50 is connected to the main bus 25.

The alternative piloting system 1 also includes a pilot monitoring device 51. The pilot monitoring device 51 is used for detecting that the airplane is in the emergency situation corresponding to the pilot being unavailable.

The pilot monitoring device 51 includes a camera for acquiring images of the pilot's face, and in particular of the pilot's eyes.

The pilot monitoring device 51 also includes a detector system capable, in less than two seconds, of detecting that the pilot is incapacitated, by using biometric sensors and specific sensors. The detection system requests the pilot to perform a continuous and deliberate action during the critical stage of takeoff. The specific sensors used for this purpose by the detection system may be pushbuttons arranged on the control column and on the throttle that need to be pressed during takeoff, or indeed optical sensors that serve to verify that the pilot's hands are indeed on the controls.

The pilot monitoring device 51 is connected to the main bus 25.

The alternative piloting system 1 also includes a virtual co-pilot device 52. The purpose of the virtual co-pilot device 52 is to anticipate risky situations and to warn the pilot in the event of such situations becoming likely to occur. Also (and above all) the virtual co-pilot device 52 has the purpose of making cross checks between the data and critical actions, and also of performing tasks in automatic manner. It, also has a voice interface with the pilot, and a visual interface. It also generates audio messages. It is made up of a state machine portion, of a processor module, and of a man machine interface (NMI) portion.

The virtual co-pilot device 52 is connected to the main bus 25.

Naturally, the invention is not limited to the embodiment described, but covers any variant coming within the ambit of the invention as defined by the claims.

The invention claimed is:

1. An alternative piloting system arranged to be integrated in a pre-existing aircraft that includes original systems comprising a flight control system and an autopilot system, the alternative piloting system comprising:
    a piloting device independent of the original systems, comprising a positioning unit arranged to produce positioning data relating to the aircraft, and a control unit arranged to produce an alternative piloting setpoint for the aircraft;
    an acquisition and analysis device, comprising acquisition means arranged to acquire data produced by the original systems and also the positioning data and the alternative piloting setpoint as produced by the piloting device, and decision means arranged to decide whether the alternative piloting setpoint should or should not be used for piloting the aircraft; and
    an interface device arranged to control the flight control system of the aircraft on the basis of the alternative piloting setpoint when the decision means of the acquisition and analysis device decide that said alternative piloting setpoint should be used for piloting the aircraft.

2. The alternative piloting system according to claim 1, the piloting device being arranged to produce the alternative piloting setpoint in such a manner that the aircraft follows a path serving to avoid the aircraft penetrating into a predefined prohibited area.

3. The alternative piloting system according to claim 1, further comprising a main bus, the piloting device, the acquisition and analysis device, and the interface device being arranged to be connected to the main bus and to communicate with one another via the main bus.

4. The alternative piloting system according to claim 3, wherein the piloting device is connected solely to the main bus.

5. The alternative piloting system according to claim 1, the alternative piloting system being arranged to pilot the aircraft when the aircraft is in an emergency situation forming part of a predefined list of emergency situations, the predefined list comprising a failure of the autopilot system, unavailability of the pilot of the aircraft, and a situation in which the aircraft is going towards a prohibited area.

6. The alternative piloting system according to claim 5, wherein the acquisition means of the acquisition and analysis device are arranged to acquire the alternative piloting setpoint, a manual piloting setpoint produced by the pilot, and an automatic piloting setpoint produced by the autopilot system, and wherein the decision means of the acquisition and analysis device are arranged to analyze these piloting setpoints and, on the basis of this analysis, to decide whether the alternative piloting setpoint should or should not be used for piloting the aircraft.

7. The alternative piloting system according to claim 6, wherein if a manual piloting setpoint is tending to cause the aircraft to go towards a prohibited area, the decision means of the acquisition and analysis device are arranged to decide that the alternative piloting setpoint should be used for piloting the aircraft so that the aircraft performs a maneuver enabling it to avoid penetrating into the prohibited area.

8. The alternative piloting system according to claim 7, wherein after performing the maneuver, the acquisition and analysis device is arranged to decide that the alternative piloting setpoint should no longer be used for piloting the aircraft, with the automatic piloting setpoint being used instead of the alternative piloting setpoint.

9. The alternative piloting system according to claim 6, wherein if a pilot of the aircraft becomes unavailable during a takeoff stage that is normally managed via a manual piloting setpoint, the acquisition and analysis device is arranged to decide that the alternative piloting setpoint should be used for piloting the aircraft during said takeoff stage.

10. The alternative piloting system according to claim 1, further comprising a communication device arranged to set up communication with the ground, so as to enable the alternative piloting system to be remotely controlled from the ground.

11. The alternative piloting system according to claim 1, further comprising a taxiing control device arranged to produce an alternative taxiing setpoint for the aircraft.

12. The alternative piloting system according to claim 1, wherein the positioning unit of the piloting device comprises an inertial measurement unit, a satellite positioning device including at least one antenna, and an air data computer, and wherein the control unit comprises two dissimilar calculation channels.

13. The alternative piloting system according to claim 1, wherein the interface device includes switch means controlled by the decision means of the acquisition and analysis device and arranged to connect an output of the piloting device to the flight control system when the alternative piloting setpoint should be used for piloting the aircraft.

14. A pre-existing aircraft including an original systems comprising a flight control system, an autopilot system, and an alternative piloting system, wherein the alternative piloting system comprises:
    a piloting device independent of the original systems, comprising a positioning unit arranged to produce positioning data relating to the aircraft, and a control unit arranged to produce an alternative piloting setpoint for the pre-existing aircraft;
    an acquisition and analysis device, comprising acquisition means arranged to acquire data produced by the original systems and also the positioning data and the alternative piloting setpoint as produced by the piloting device, and decision means arranged to decide whether the alternative piloting setpoint should or should not be used for piloting the pre-existing aircraft; and
    an interface device arranged to control the flight control system of the aircraft on the basis of the alternative piloting setpoint when the decision means of the acquisition and analysis device decide that said alternative piloting setpoint should be used for piloting the pre-existing aircraft.

* * * * *